United States Patent [19]

Willis et al.

[11] Patent Number: 4,593,315

[45] Date of Patent: Jun. 3, 1986

[54] PROGRESSIVE SCAN TELEVISION RECEIVER FOR NON-STANDARD SIGNALS

[75] Inventors: Donald H. Willis; Todd J. Christopher, both of Indianapolis, Ind.

[73] Assignee: RCA Corporation, Princeton, N.J.

[21] Appl. No.: 615,423

[22] Filed: May 29, 1984

[51] Int. Cl.$^4$ .............................................. H04N 7/01
[52] U.S. Cl. ...................................... 358/140; 358/11
[58] Field of Search ................... 358/140, 11, 188, 160

[56] References Cited

U.S. PATENT DOCUMENTS

| | | | |
|---|---|---|---|
| 3,073,896 | 1/1963 | James ............................... | 358/140 X |
| 3,830,971 | 8/1974 | van de Polder .................... | 350/140 |
| 4,249,198 | 2/1981 | Ito et al. ............................ | 358/13 |
| 4,322,750 | 3/1982 | Lord et al. ......................... | 358/140 |
| 4,389,668 | 6/1983 | Favreau ............................. | 358/140 X |
| 4,400,719 | 8/1984 | Powers .............................. | 358/21 R |
| 4,415,931 | 11/1983 | Dischert ............................ | 358/242 |
| 4,443,821 | 4/1984 | Kato .................................. | 358/326 |
| 4,467,357 | 8/1984 | Cantou .............................. | 358/148 |
| 4,536,794 | 8/1985 | Fernsler et al. .................... | 358/158 |

FOREIGN PATENT DOCUMENTS 3323439  5/1984  Fed. Rep. of Germany .

OTHER PUBLICATIONS ntz ARCHIV, vol. 4, Oct. 1982, D. Uhlenkamp et al., "Verbesserte Widedengabe von Norm-Fernsehsignalen" pp. 313-321.

*Primary Examiner*—Michael A. Masinick
*Assistant Examiner*—Victor R. Kostak
*Attorney, Agent, or Firm*—P. J. Rasmussen; P. M. Emanuel; R. G. Coalter

[57] ABSTRACT

Plural phase detectors in a progressively scanned television receiver measure the phase of the receiver video speed-up memory read and write clocks with respect to the double line-rate horizontal sweep signal of the display. Delay means are provided for delaying the video signal recovered from the memory as a function of the difference between the read and write clock phase measurements each time the memory is read. The delay is effective for minimizing visible artifacts which otherwise may tend to occur when displaying "non-standard" video signals wherein the ratio of the color-subcarrier frequency to the line-frequency of the incoming video signal differs from a given broadcasting standard.

1 Claim, 2 Drawing Figures

PROGRESSIVE SCAN TELEVISION RECEIVER FOR NON-STANDARD SIGNALS

FIELD OF THE INVENTION

This invention relates to television receivers and particularly to receivers of the type employing "progressive scanning" to effectively increase the vertical resolution of displayed images.

BACKGROUND OF THE INVENTION

"Progressively" scanned television receivers have been proposed wherein the horizontal scan rate is multiplied, i.e., doubled, and each line of video is displayed twice thereby providing a displayed image having reduced visibility of line structure and subjectively improved vertical resolution. In a typical progressively scanned receiver, each line of video is stored in one of two memories. As one of the memories is being written with the incoming video signal at the standard line rate, the other memory is read two times at twice the standard line rate thereby providing two lines of time compressed video within one standard line interval. The memory output is applied to a display having a doubled horizontal sweep rate synchronized with read-out of the memory thereby doubling the number of displayed lines of video signal.

An example of a progressively scanned receiver, wherein the added video lines are not interpolated from the original scan lines, is described in U.S. Pat. No. 4,415,931 entitled TELEVISION DISPLAY WITH DOUBLED HORIZONTAL LINES which issued Nov. 15, 1983 to R. A. Dischert. A doubly scanned receiver in which the additional scan lines are obtained by interpolation from the original scan lines is described by K. H. Powers in U.S. Pat. No. 4,400,719 entitled TELEVISION DISPLAY SYSTEM WITH REDUCED LINE-SCAN ARTIFACTS which issued Aug. 23, 1983. The arrangements disclosed in these patents are incorporated by reference herein.

When implementing a progressively scanned receiver with digital signal processing circuits, one may employ random access memories (RAM) for the line stores. Digital signal processing typically utilizes a coherent clock for purposes of signal sampling (in the A/D converter), memory address control and other functions. For simplicity of chroma processing, the clock is typically phase locked to an integer multiple of the color subcarrier frequency. For NTSC standard video signals, the memory write clock frequency is typically selected to be four times that of the color subcarrier (4 fsc) or about 14.3 MHz with a period of about 70 nanoseconds. One line of memory, for this clock frequency and the standard NTSC line period of about 63.5 microseconds, therefore requires 910 locations in RAM to store 910 video samples of "pixels" (picture elements). This memory requirement is invariant for NTSC standard signal because under the NTSC standard there are exactly 227.5 color subcarrier cycles per horizontal line. With D/A conversion done at four times the color subcarrier frequency (4 fsc) there are thus, exactly 910 (4×227.5) pixels per line. As long as the memory read clock is exactly double the frequency of the write clock, the resultant "double-speed" or "time-compressed" pixels will have proper horizontal spacing and vertical alignment when displayed.

SUMMARY OF THE INVENTION

It is recognized herein that a subtle problem exists in pro-scan systems of the type described when displaying what will be referred to hereinafter as non-standard video signals. As used herein, the term non-standard refers to video signals wherein the ratio of the color subcarrier frequency to horizontal line frequency does not conform exactly to a specified broadcasting standard (e.g., 227.5 in the NTSC standard). Where, for example, the video source is a video disc player, a video cassette recorder, a video "game" unit or some other non-standard source, the burst/line-frequency ratio may vary over a continuum within certain limits. These limits may include a significant variation from the standard ratio over a range of values (e.g., from 226.5 to 228.5, for example). Under these conditions, the number of video samples (pixels) in a horizontal line period will not, in general, be 910 (assuming a 4 fsc write clock). The number of 4 fsc clock periods contained within one horizontal line period, in other words, will differ from the standard and this difference may include a fractional part of one pixel.

The deviation of the number of samples (pixels) per line from the standard (910) is difficult to deal with because it represents a precession of the A/D converter sampling signal clock phase with respect to the incoming horizontal synchronizing signal phase. The effect of this precession or "phase-slip" or "skew" is that horizontal timing errors accumulate throughout each field scan. Moreover, in a progressive scan system, where a coherent 8 fsc read clock is used with double (2 H) standard rate deflection for the display, the 8 fsc read clock precession relative to the 2 H deflection will be double that of the 4 fsc (write) clock precession relative to the 1 H incoming video signal. This problem is unique to progressive scan systems and can cause accumulated horizontal timing errors, for the assumed conditions, of 12% (or more) of a line over a field interval or full-pixel timing discontinuities between occassional lines. The visible effects may be seen as picture skew, ragged edges or other undesirable artifacts.

In view of the foregoing, one might consider pre-processing the video signal prior to "speed-up" in the progressive scan processor (PSP) with a conventional time-base corrector (TBC). Examples of time-base correctors suitable for use with video tape recorder (VTR) reproduced signal are given in U.S. Pat. Nos. 4,249,198 of Ito et al., and 4,443,821 of Kato, herein incorporated by reference. In Ito et al. a digitized video signal provided by an un-synchronized VTR is stored in the TBC memory (one field) and the storage location as well as delay prior to storage of the video signal is controlled in response to the phase difference between the incoming video synchronizing signal components and a constant reference signal (e.g., "house sych"). The TBC of Kato is specifically addressed to correcting intra-line velocity errors of a VTR reproduced signal and includes a velocity error detector for detecting velocity errors in successive lines of the video signal written into memory. A sample level compensator at the output of the TBC memory adjusts the level of the video samples (pixels) read out from the memory as a function of the detected velocity error such that the level of the read out sample is modified to be equal to the level that the read-out sample should have had at the time it was read if there had been no velocity error.

It is recognized herein that the use of conventional time-base correctors will not solve the unique problems encountered in progressively scanned ("pro-scan" hereinafter) video display systems. The problem in progessive scan systems involves more than time-base errors (e.g., "jitter"), it involves non-standard signals wherein there may be a variation of the number of pixels per line and this variation is effectively multiplied by the double reading of each line which occurs only in pro-scan systems.

The aforementioned problem does not exist in conventional time-base correctors because there each line is read only once. Simply stated, in a progressively scanned display system, the second memory read operation for "non-standard" video signals (as hereinbefore defined) may require a different time-base compensation then the first memory read operation and each read operation may require video delay compensation which is a fractional part of a pixel interval. Moreover, if left un-corrected, read errors caused by variations of the number of pixels per line due to a non-standard signal tend to accumulate as previously mentioned.

A progressive scan display apparatus in accordance with the invention includes means for measuring the phase of the memory read and write clocks with respect to the horizontal sweep signal of the display. Means are provided for delaying the video signal recovered from the memory as a function of the difference between the read and write clock phase measurements each time the memory is read.

BRIEF DESCRIPTION OF THE DRAWING

The invention is illustrated in the accompanying drawing, wherein like elements are identified by like designators, and in which.

DETAILED DESCRIPTION

Figure 1:
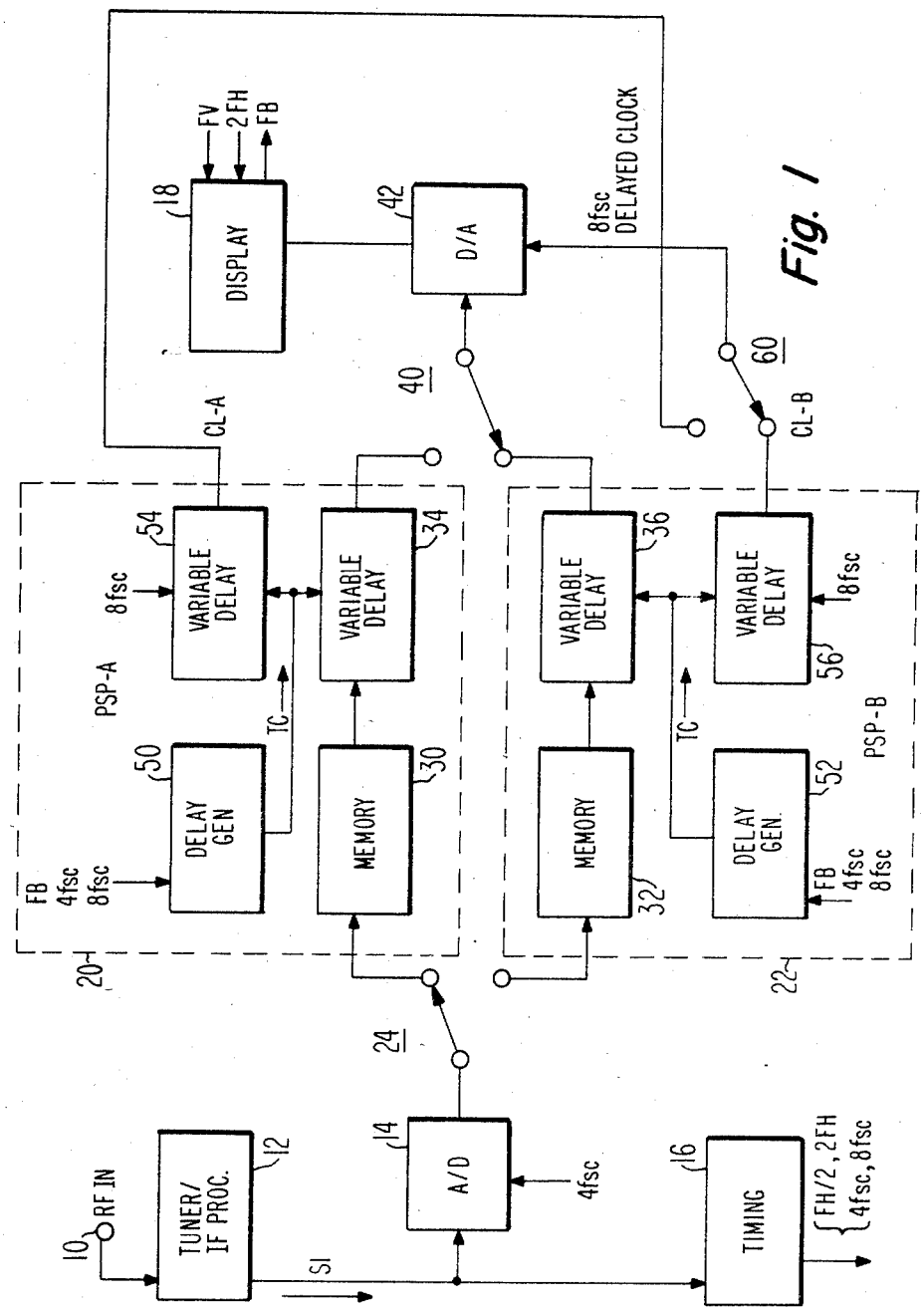
FIG. 1 is a block diagram of a television receiver embodying the invention.

The receiver of FIG. 1 includes an input terminal 10 for connection to a source of television signals. When connected to an antenna for receiving standard broadcast signals, the received signal will conform to a standard (NTSC, for example) wherein the number of color subcarrier cycles per horizontal line is known exactly (e.g., 227.5). When connected to another source, such as a "consumer" disc or tape recorder, the color subcarrier/line frequency ratio may differ from the exact broadcast standard as previously discussed and this difference may tend to result in various visible artifacts being displayed if not compensated for as described hereinafter.

Terminal 10 is connected to a tuner/IF processing unit 12 of conventional design to provide a baseband video output signal S1. To simplify the drawing no audio processing is shown. The baseband video signal S1 is applied to an analog-to-digital (A/D) converter 14 and to a timing unit 16. Unit 16 includes conventional sync and burst detectors and multiplying phase locked loops to generate a plurality of timing signals including memory read and write clocks phase-locked to eight and four times the color subcarrier frequency, respectively, (8 fsc, 4 fsc). Half line rate signals (FH/2) are provided for controlling memory read/write selection and double line rate signals (2 FH) are provided for timing the horizontal sweep of the receiver display 18.

Alternate lines of the digitized video signal S1 are applied to respective ones of two progressive scan processors 20, 22 by means of a switch 24 which is controlled by the half line-rate timing signal (FH/2) provided by timing unit 16. For purposes of discussion it will be assumed that switch 24 is in the position shown (upward) for even lines of the video signal S1 for storing (writing) signal S1 in the memory portion of processor 20 and that switch 24 is in the opposite position for odd lines for writing signal S1 in the memory portion of processor 22.

Each of processors 20 and 22 includes a respective memory unit 30, 32 of conventional design (e.g., a random access memory and associated address counter) which receives 4 fsc write clock signals and 8 fsc read clock signals from timing unit 16. The outputs of memories 30 and 32 are coupled via respective variable delay units 34 and 36 to a switch 40 for application to display 18 via a digital-to-analog converter 42. During even lines, switch 40 (in the position shown) couples the output of memory 32 to converter 42 and during odd lines it couples the output of memory 30 to converter 42.

Each of progressive scan processors 20 and 22 includes a respective delay signal generator 50 and 52. Generator 50 controls the delay of unit 34 and of another variable delay unit 54 which imparts a variable delay to the 8 fsc clock signal to provide a modified clock signal CL-A. Generator 52 is similarly coupled to unit 36 and to another variable delay unit 56 which provides a variably delayed 8 fsc clock output signal CL-B. The two clock signals are coupled via another switch 60 to the clock input of D/A converter 42. Switch 60 is synchronized with switch 40 such that D/A converter 42 alternately receives video and clock signals from progressive scan processors 20 and 22.

With the exception of the variable delay processing, as will be described, overall operation of the progressively scanned receiver is conventional. Briefly, the digitized video signal S1 is alternately stored in the memories 30 and 32. As one line is being written into memory 30, the previously stored line in memory 32 is read twice, converted back to analog form in converter 42 and then displayed on display 18 (e.g., a kinescope or projection display) which has a doubled horizontal sweep rate (2 FH) thereby displaying two lines of video for each line received. The second line of each line pair may be interpolated as is known in the art or it may be an exact replica of the first line. Of importance to the present invention is the determination of the exact starting point for each displayed line and this is controlled in accordance with the invention by means of the delay generators and variable delay units in progressive scan processors 20 and 22.

Generators 50 and 52 each include circuits for measuring the phase of the respective memory read and write clocks with respect to the double line-rate (2 FH) horizontal sweep signal of display 18. Units 34 and 36 delay the video signal recovered from memory as a function of the difference between the read and write clock phase measurements upon each memory read operation. Recall that for "non-standard" video input signals the phase of the 4 fsc memory write clock is constantly precessing (slipping) with respect to the horizontal synchronizing signal component of the incoming video signal and thus, is also precessing (at double rate) with respect to the horizontal deflection signal supplied to display 18. The write clock phase with respect to the horizontal deflection pulse (e.g., the flyback pulse, FB, obtained from display 18) is measured at the start of each writing line interval. This phase measurement may be expressed as a percentage of the writing pixel period (70 nanoseconds for the assumed 4 fsc NTSC write clock). This "fraction", TW hereinafter, will be a number lying within a range between zero and unity. The number TW is stored for use during the following two read operations when the stored line is recovered from memory. At the start of each of the two read operations when the stored line is to be displayed, the phase of the 8 fsc read clock is measured with respect to the horizontal deflection (flyback) pulse FB. These measurements may also be expressed as fractions and will be referred to herein as TD-1 and TD-2 depending on whether it is the start of the first read (TD-1) or the start of the second read (TD-2) of the stored line.

In general, for non-standard signals. the phase measurements will differ, that is, (TW)≠(TD-1)≠(TD-2). In order for the pixels to be uniformly spaced horizontally and properly aligned vertically, without "crawl" or other undesirable artifacts, delays are selectively introduced in the video signal path such that, in effect, (TW)=(TD-1)=(TD-2). The measured value of TW is compared with that of TD-1 during the first memory read operation and the difference (TW)−(TD-1) is obtained. During the second memory read opertion the same comparison is made between TW and TD-2. For each read operation the amount of delay (expressed as a percentage of the read clock period of 35 nanoseconds) is added to the displayed signal by means of unit 34 in processor 20 or unit 36 in processor 22. This corrects for the fractional pixel period error characteristic of the non-standard video signal.

The correction signal, TC in the drawing, is applied to both the video signal and the 8 fsc clock for D/A converter 42 to ensure that the D/A converter implements the desired delay in the video signal.

Figure 2:
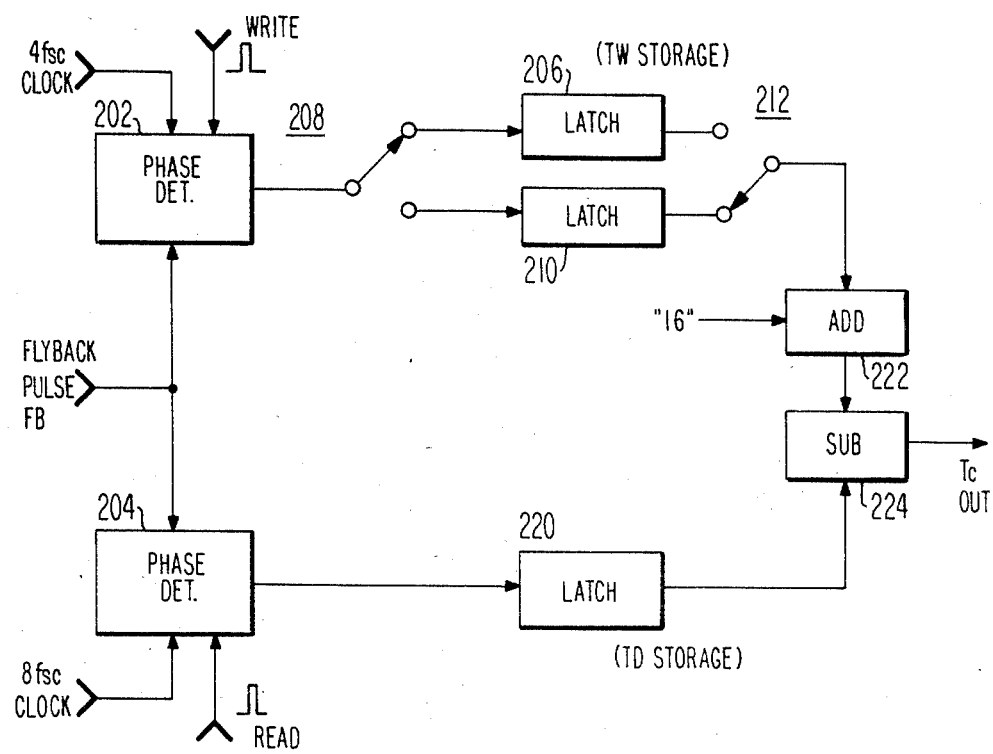
FIG. 2 is a detailed block diagram of a portion of the receiver of FIG. 1.

FIG. 2 is a block diagram illustrating a suitable implementation of the delay generator used in progressive scan processors 20 or 22. The flyback pulse FB is applied to two phase detectors 202, 204 which receive, respectively, the 4 fsc write clock and the 8 fsc read clock signals. Detectors 202 and 204 are keyed by write and read pulses (provided by circuit 16). On the first 4 fsc clock pulse after the flyback pulse FB, the processor memory has the first pixel written into it. Detector 202 measures the time difference between the flyback pulse and the first cycle of the 4 fsc write clock and provides a (4 bit) binary number, TW, equal to the number of sixteenths of the 4 fsc clock period that the signals differ by. This corresponds to a measurement resolution of about four nanoseconds which, for practical purposes, is adequate for purpose of the present invention. The write clock phase measurement TW is stored in a latch 206 via a line rate switch 208. During the next line TW is latched in a second latch 210. A switch 212 is synchronized with switch 208 to enable reading of a previous stored value of TW while a new one is being written.

When one complete line of video is stored in memory 30 and is ready to be read the 8 fsc read clock phase is measured (detector 204) with respect to flyback pulse FB and stored in a "TD" storage latch 220. The correction delay TC for the variable delay units of the progressive scan processor is determined by adding binary "16" to the stored number TW in an adder 222 and then subtracting the stored value of TD from the sum in a subtractor 224. Accordingly the resultant value of the delay compensating signal is given by TC=TW−TD+16 for each line of video recovered from memory 30 (or 32 in processor 22). The number 16 is added to simplify the subtraction circuitry by assuring that TC can never be negative. This "offset" corresponds to a constant one pixel delay in the overall system and may either be ignored (it will lie in the display overscan area) or it may be corrected by reading the processor memory with a one-count shift in the memory address. The value of TC ranges from zero to thirty-one (5 binary bits after the addition) so that the controlled pixel delay implementing the correction will correspond to a signal delay varying from zero to one and fifteen-sixteenths pixel periods (one pixel period for read out is about 35 nanoseconds).

Although the delay compensation in the generator 50 (or 52) of FIG. 2 is processed in terms of fractions (sixteenths) of a pixel, it may readily be processed directly in terms of time. If so, FIG. 2 should be modified by dividing the value of the write measurement by 2 (a simple one shift operation in binary arithmetic) to take into account that phase errors of the 4 fsc write clock are doubled with respect to the 8 fsc read clock. It will also be appreciated that adder 222, if used, may follow subtractor 224 although, in that case, the subtractor would have to handle negative numbers.

What is claimed is:

1. In a progressive scan receiver of the type having memory means, a source of memory read and write clock signals coupled to said memory means for storing a video signal in said memory means and for recovering each stored line of said video signal N times for application to display means having a horizontal sweep rate selected for displaying said video signal occurring N times, the improvement comprising:

first means for measuring the phase of said memory read and write clock signals, each with respect to a horizontal synchronizing signal associated with said display means; and second means for delaying the recovered video signal as a function of the difference between the read and write clock phase measurements each time the memory is read.

* * * * *